(12) United States Patent
Oehl et al.

(10) Patent No.: US 12,419,227 B2
(45) Date of Patent: Sep. 23, 2025

(54) INJECTION TOOLS FOR USE IN PLANT INJECTION SYSTEMS, AND METHODS FOR USING THEREOF

(71) Applicant: Invaio Sciences International GmbH, Basel (CH)

(72) Inventors: Michael Christian Oehl, Reinach (CH); Dimitri Verweire, Zurich (CH); Urs Widmer, Dornach (CH)

(73) Assignee: INVAIO SCIENCES INTERNATIONAL GMBH, Basel (CH)

( * ) Notice: Subject to any disclaimer, the term of this patent is extended or adjusted under 35 U.S.C. 154(b) by 0 days.

(21) Appl. No.: 18/280,851

(22) PCT Filed: Mar. 8, 2022

(86) PCT No.: PCT/EP2022/055806
§ 371 (c)(1),
(2) Date: Sep. 7, 2023

(87) PCT Pub. No.: WO2022/189386
PCT Pub. Date: Sep. 15, 2022

(65) Prior Publication Data
US 2024/0138321 A1     May 2, 2024

Related U.S. Application Data

(60) Provisional application No. 63/158,751, filed on Mar. 9, 2021.

(51) Int. Cl.
*A01G 7/06*     (2006.01)
(52) U.S. Cl.
CPC ..................................... *A01G 7/06* (2013.01)

(58) Field of Classification Search
CPC ....................................................... A01G 7/06
See application file for complete search history.

(56) References Cited

U.S. PATENT DOCUMENTS 5,239,773 A * 8/1993 Doolittle, Jr. .......... A01G 29/00
47/57.5
5,797,215 A * 8/1998 Doolittle .................. A01G 7/06
47/57.5

(Continued)

FOREIGN PATENT DOCUMENTS

| CN | 102984934 A | 3/2013 |
| WO | WO-2020021041 A1 | 1/2020 |
| WO | WO-2020212612 A1 | 10/2020 |

OTHER PUBLICATIONS

International Search Report and Written Opinion received for International Patent Application No. PCT/EP2022/055806 mailed on Jul. 26, 2022, 14 pages.

*Primary Examiner* — Christopher D Hutchens
*Assistant Examiner* — Edgar Reyes
(74) *Attorney, Agent, or Firm* — Harness, Dickey & Pierce, P.L.C.

(57) ABSTRACT

Provided herein are injection tools (100; 200; 300; 400; 500) for use in injection systems configured to penetrate a plant and distribute a liquid formulation to the plant. The injection tool includes a base (104; 204; 304; 404; 504) with one or more inlets (122; 222; 322; 422; 522) to receive liquid formulation, and a penetrating distribution body (102; 202; 302; 402; 502) connected to the base (104; 204; 304; 404; 504). The penetrating distribution body (102; 202; 302; 402; 502) includes a cutting element (110; 210; 310; 410; 510), and a plurality of distribution reservoirs (128; 228; 328; 428; 528) arranged in one or more rows that are positioned between the cutting element (110; 210; 310; 410; 510) and the base (104; 204; 304; 404; 504). Primary distribution (Continued)

channels (126; 226; 326; 426; 526) connect the one or more of the inlets (122; 222; 322; 422; 522) to the plurality of distribution reservoirs (128; 228; 328; 428; 528). Secondary distribution channels (130; 230; 330; 430; 530) connecting adjacent distribution reservoirs (128; 228; 328; 428; 528) within a row. The distribution reservoirs (128; 228; 328; 428; 528) retain the liquid formulation proximate to adjacent tissue of the plant. The tools, systems and methods herein allow for precise delivery of a liquid formulation into the vasculature of a plant.

11 Claims, 5 Drawing Sheets

(56) References Cited

U.S. PATENT DOCUMENTS

| | | | | | |
|---|---|---|---|---|---|
| 5,956,894 | A * | 9/1999 | Eldridge | A01G 7/06 47/57.5 |
| 8,677,684 | B1 * | 3/2014 | Doolittle | A01G 29/00 47/57.5 |
| 10,624,272 | B1 * | 4/2020 | Doolittle | A01G 7/06 |
| 10,681,874 | B1 * | 6/2020 | Scarlata | A01G 7/06 |
| 11,844,318 | B2 | 12/2023 | Schupbach et al. | |
| 2004/0079169 | A1 * | 4/2004 | Wild | A01G 7/06 73/861 |
| 2007/0033870 | A1 * | 2/2007 | Burgess | A01G 7/06 47/57.5 |
| 2014/0345194 | A1 * | 11/2014 | Vue | A01G 7/06 47/57.5 |
| 2015/0296801 | A1 | 10/2015 | Brahm et al. | |
| 2015/0305253 | A1 * | 10/2015 | Park | A01G 7/06 47/57.5 |
| 2015/0351327 | A1 * | 12/2015 | Davis, Jr. | A01G 7/06 47/57.5 |
| 2021/0092907 | A1 * | 4/2021 | Simmons | A01G 7/06 |
| 2021/0337739 | A1 | 11/2021 | Schupbach et al. | |
| 2022/0201940 | A1 | 6/2022 | Schupbach et al. | |
| 2023/0084693 | A1 | 3/2023 | Widmer et al. | |
| 2023/0138405 | A1 * | 5/2023 | Wise | A01G 7/06 47/57.5 |
| 2023/0240199 | A1 | 8/2023 | Widmer et al. | |
| 2024/0081195 | A1 | 3/2024 | Chettoor et al. | |
| 2024/0260513 | A1 | 8/2024 | Schupbach et al. | |

* cited by examiner

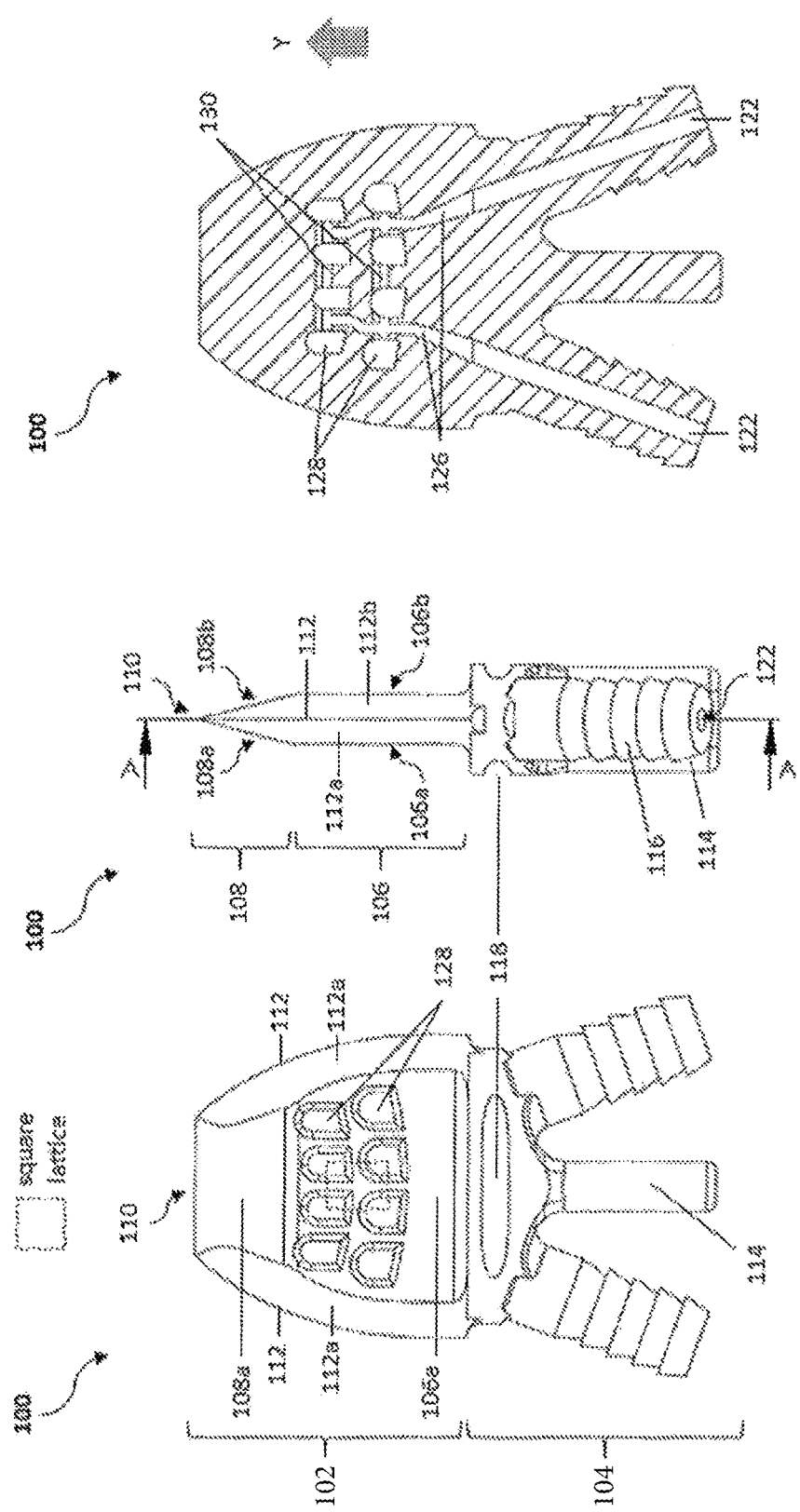

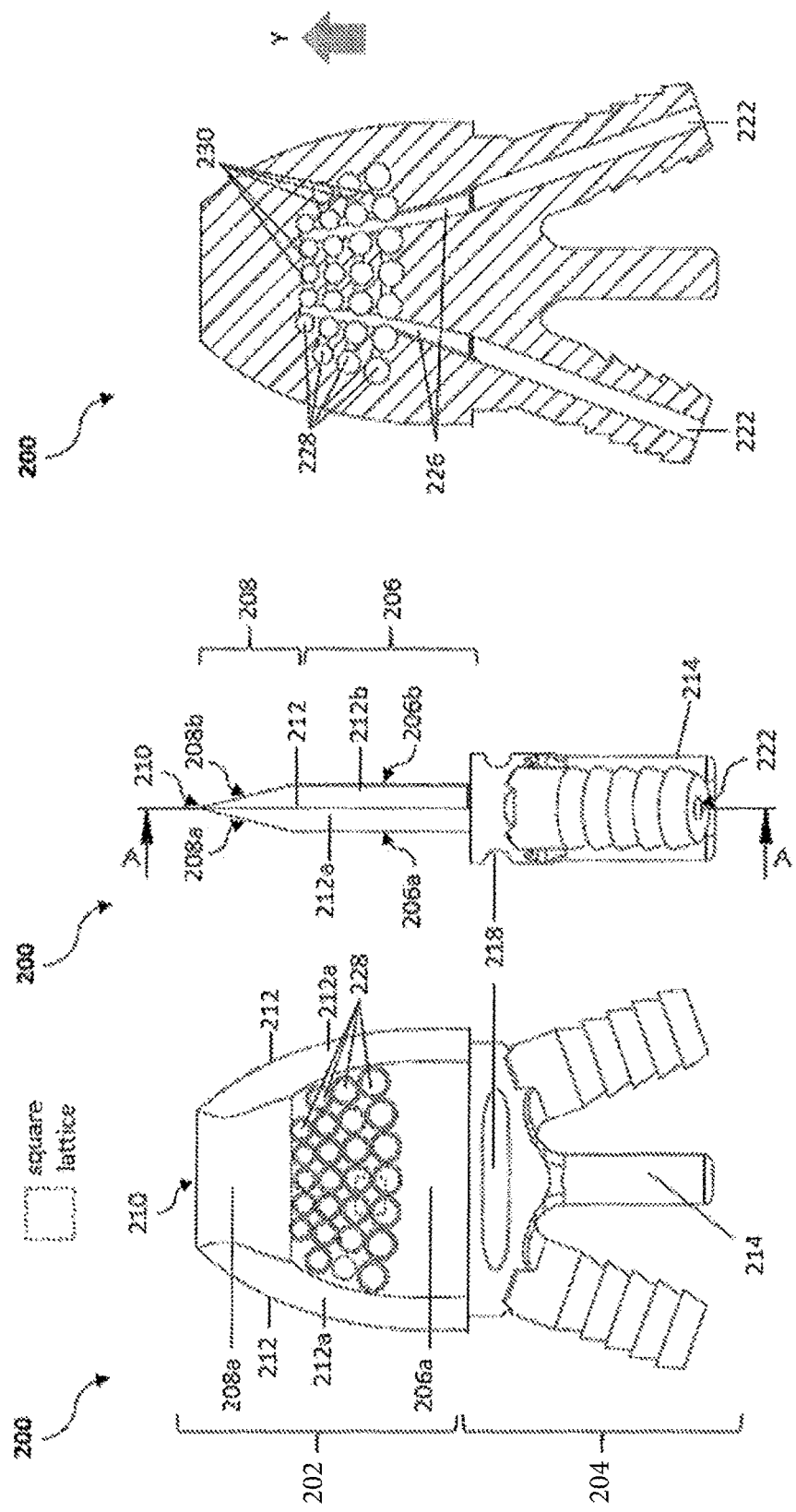

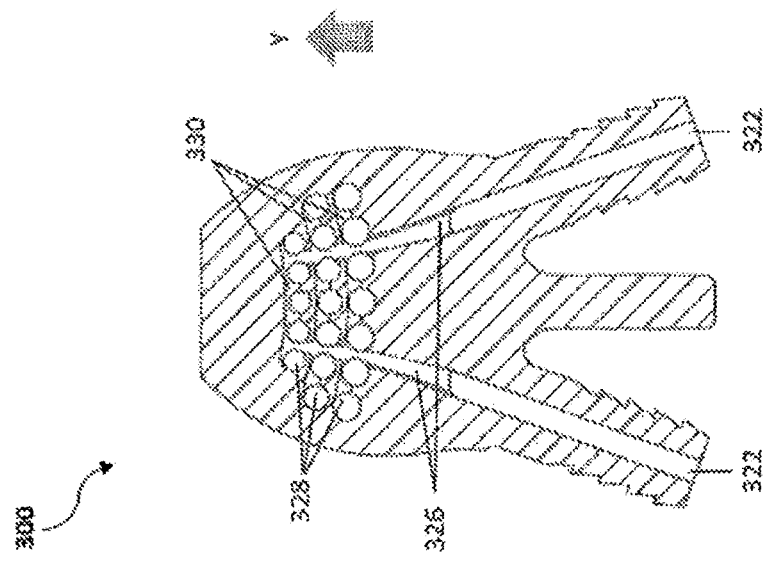
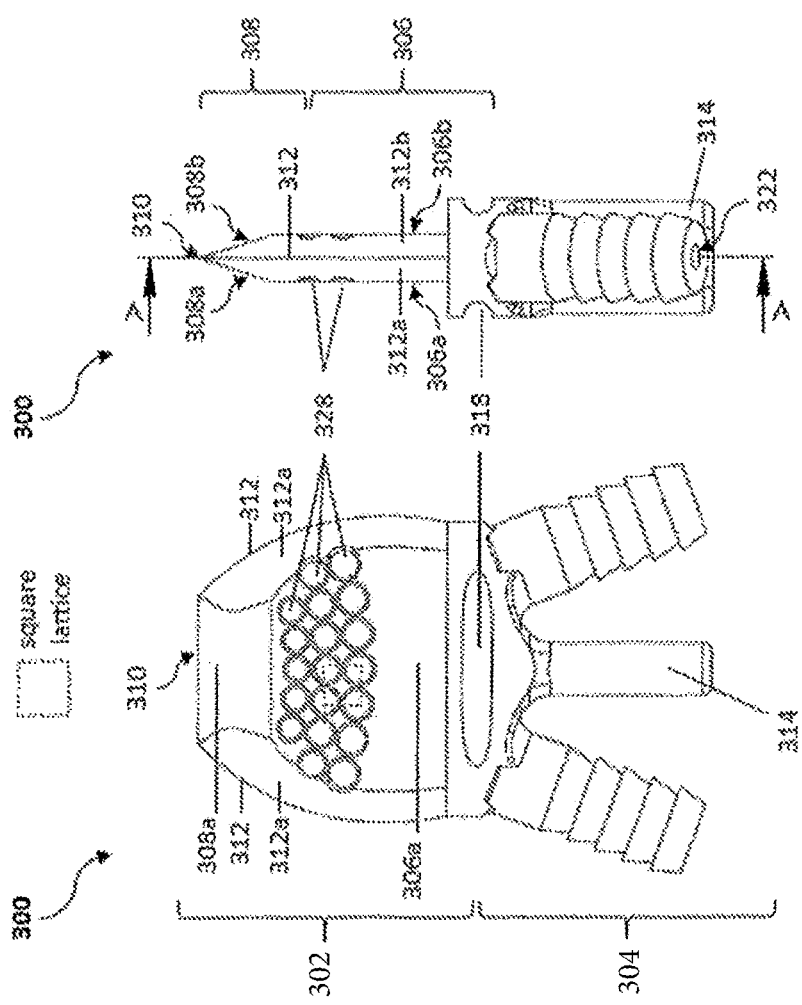
FIG. 3A    FIG. 3B    FIG. 3C

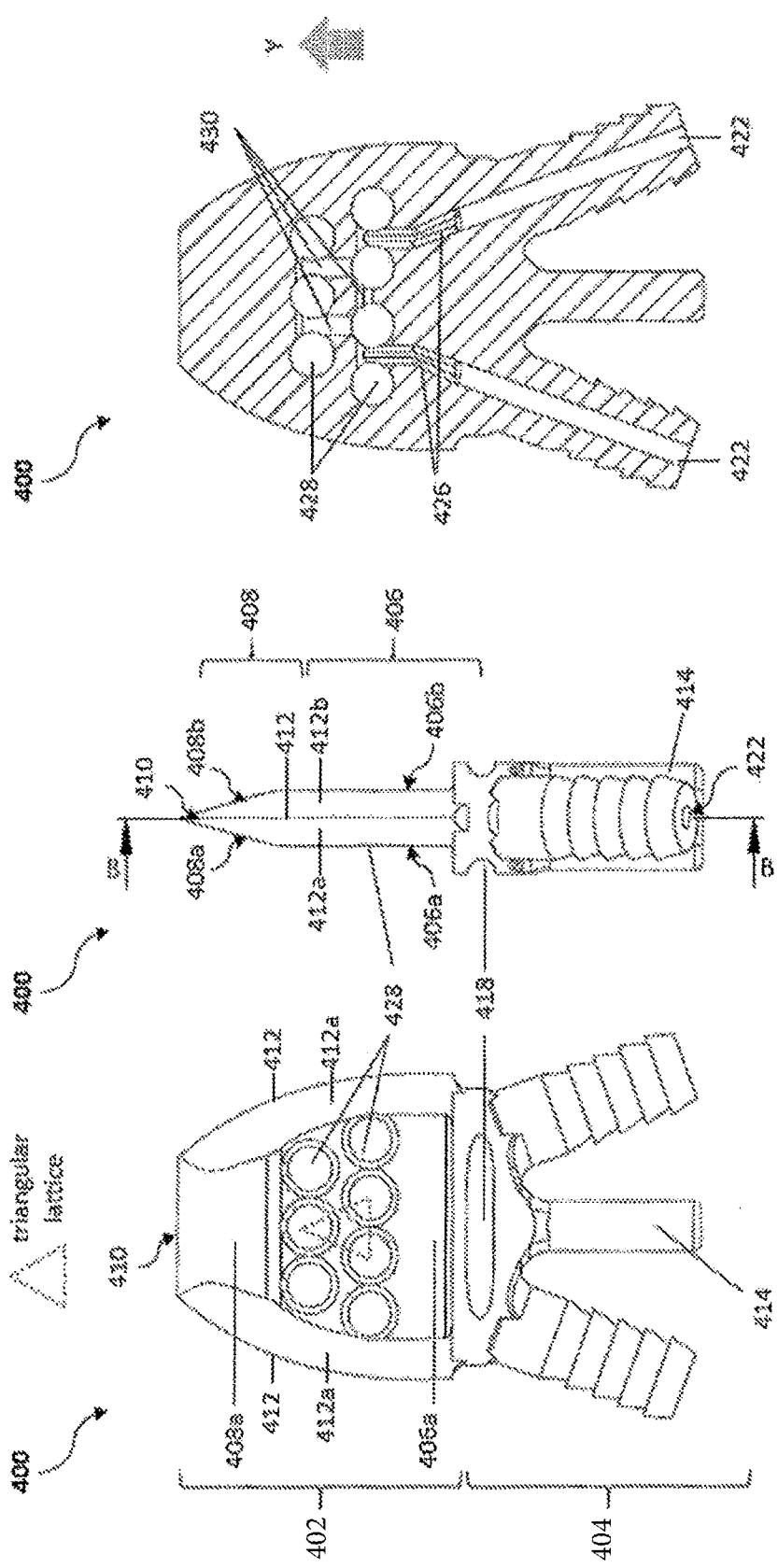

INJECTION TOOLS FOR USE IN PLANT INJECTION SYSTEMS, AND METHODS FOR USING THEREOF

CROSS-REFERENCE TO RELATED APPLICATIONS

This application is a national stage application under 35 U.S.C. § 371 of International Application No. PCT/EP2022/055806, filed internationally Mar. 8, 2022, which claims priority to U.S. Provisional Patent Application No. 63/158,751, filed Mar. 9, 2021, each of which is incorporated herein by reference in its entirety.

FIELD

The present disclosure relates generally to systems and methods for administering formulations to plants, including injection tools, systems incorporating such injection tools, and methods of using such injection tools and system for injecting liquid formulations into plants.

BACKGROUND

Tree injection has been used for administration of liquids to trees. Conventional tree injection approaches can involve drilling a borehole in a tree trunk and stoppering the borehole with a peg. A needle is inserted through the peg to discharge liquid into the borehole.

What is desired in the art are alternative ways for injecting liquid formulations into a plant that can reduce or minimize damage to the plants, but can effectively and directly control bacteria, fungi, virus and/or other pathogens that cause disease in plants. What is also desired in the art are also injection tools used for delivering the liquid formulations that are less prone to bending and/or fracturing from insertion into the plant.

BRIEF SUMMARY

In some aspects, provided is a plant injection tool configured to penetrate a trunk or stem of a plant in an insertion direction. In some embodiments, provided is a plant injection tool, comprising: a base, and a penetrating distribution body connected to the base. In certain embodiments, the base comprises one or more inlets to receive liquid formulation. In certain embodiments, the penetrating distribution body is connected to the base, and comprises: a cutting element; a plurality of distribution reservoirs arranged in one or more rows that are positioned between the cutting element and the base, wherein at least a portion of each distribution reservoir has a round shape; primary distribution channels connecting the one or more of the inlets to at least one distribution reservoir; and secondary distribution channels connecting adjacent distribution reservoirs. In some variations, the plurality of distribution reservoirs is arranged in a plurality of rows. In certain variations, the distribution reservoirs are arranged in a square lattice, or in a triangular lattice.

In certain aspects, provided is a plant injection system, comprising: any of the plant injection tools described herein, operatively connected to a fluid delivery unit, which is configured to deliver a liquid formulation.

In other aspects, provided is a method for controlling pathogens causing disease in a plant or for preventing disease in a plant. The plant has a trunk or stem. The plant further has an active vasculature that runs through the trunk or stem to other parts of the plant. In certain embodiments, the method comprises: injecting a liquid formulation into the trunk or stem, and no further than the active vasculature of the plant, using any of the injection tools or the plant injection systems described herein.

DESCRIPTION OF THE FIGURES

The present application can be understood by reference to the following description taken in conjunction with the accompanying figures.

FIGS. 1A-1C, 2A-C, 3A-C, 4A-C, and 5A-C depict various views of exemplary injection tools used in certain embodiments of the injection systems described herein.

DETAILED DESCRIPTION

Figures 5A, 5B, 5C:
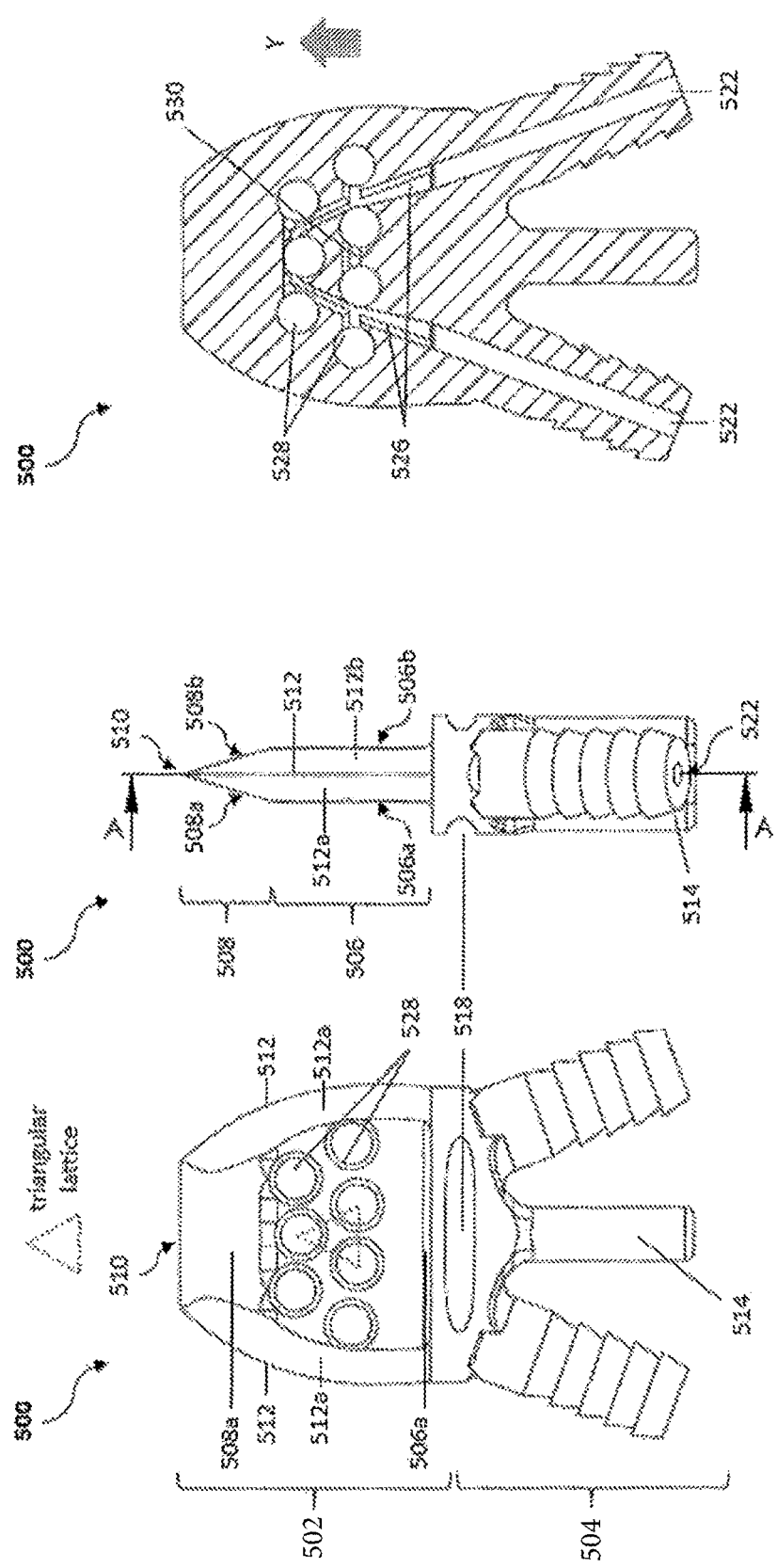

The following description sets forth exemplary methods, parameters, systems, devices and the like. It should be recognized, however, that such description is not intended as a limitation on the scope of the present disclosure but is instead provided as a description of exemplary embodiments.

Where ever the phrase "for example," "such as," "including" and the like are used herein, the phrase "and without limitation" is understood to follow unless explicitly stated otherwise. Similarly, "an example," "exemplary" and the like are understood to be non-limiting.

The terms "comprising" and "including" and "having" and "involving" (and similarly "comprises", "includes," "has," and "involves" and other forms of the terms) and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c.

Where ever the terms "a" or "an" are used, "one or more" is understood, unless such interpretation is nonsensical in context.

In some aspects, provided herein are injection tools for use in injection systems to deliver the liquid formulation to a plant, such as a tree. In certain embodiments, the injection system comprises: an injection tool operatively connected to a fluid delivery unit.

When the injection tool is inserted into the plant (e.g., a trunk), there is typically compression on the injection tool, which can lead to clogging of the injection tool. In certain variations, the injection tools described herein are designed to reducing clogging of the distribution reservoirs and/or distribution channels upon insertion into the plant. In certain variations, the injection tools described herein are also designed to maximize lateral spread of the formulation.

In some embodiments, the injection tool comprises: a base, and a penetrating distribution body (or "body") connected to the base. In some variations, the base comprises one or more inlets to receive liquid formulation, for example, from the fluid delivery unit. In some variations, the penetrating distribution body comprises: a cutting element, a plurality of distribution reservoirs, primary distribution channels connecting the one or more of the inlets to at least one of the distribution reservoirs, and secondary distribution channels connecting adjacent distribution reservoirs. In certain variations, the distribution reservoirs are arranged in one or more rows that are positioned between the cutting element and the base. In certain variations, at least a portion of each distribution reservoir has a round shape. The size and shape of the distribution reservoirs can be selected to match active vasculature of the plant.

In some variations of the injection tool, the body is shaped to pierce the plant, such as the trunk of the tree. In certain variations, the body is in the shape of a blade. In certain variations, the body has a cutting edge at the tip of the body, and the width of the cutting edge is narrower than width of the body in the area connected to the base.

In other variations of the injection tool, the plurality of distribution reservoirs is arranged in a plurality of rows. The plurality of distribution reservoirs are arranged to: (i) maximize lateral spread of the liquid formulation; or (ii) minimize clogging of the distribution reservoirs and/or distribution channels upon insertion into the plant, or both (i) and (ii).

In certain variations, at least one distribution reservoir retains the liquid formulation proximate to adjacent tissue of the plant. In certain variations, the fluid delivery unit is configured to deliver the liquid formulation. In certain variations, the fluid delivery unit is configured to store and deliver the liquid formulation. In certain variations, the fluid delivery unit is spring-loaded fluid delivery unit, or comprises a pressurized container (e.g., a pressurized canister).

In some variations of the foregoing, provided is an injection system that further comprises a source of active ingredient (including, for example, nutrients) formulated as a liquid. In other variations, the source of active ingredient is formulated as a semi-solid.

In some embodiments, provided are also methods of using the injection tools and injection systems described herein. In certain embodiments, the method comprises: injecting a liquid formulation into a post portion of a plant (e.g., the trunk or stem of a tree). In certain variations, the method comprises: piercing a post portion of a plant (e.g., the trunk or stem of a tree) using the injection tool of the injection system; and delivering at least a portion of the liquid formulation from the fluid delivery unit through the injection tool to the vasculature of the plant. In some variations, the liquid formulation is delivered pneumatically or hydraulically.

In certain embodiments, the method comprises delivering a formulation comprising one or more nutrients into a plant (e.g., a tree). In certain embodiments the method comprises precision delivery (also referred to as "precision injection") of a formulation into the plant. Precision delivery refers to delivering the formulation only or substantially only into a target location in the plant. For example, in some embodiments, the target location is the active vasculature of the tree. In some variations, the active vasculature of a tree is the xylem and/or the phloem. In other embodiments, precisely delivering the liquid formulation comprises inserting the injection tool such that the distribution reservoir is positioned in and no further than the active vasculature of the plant.

In some variations, the liquid formulation is delivered into and no further than the active vasculature of the plant when the injection tool is inserted into the post portion of the plant. In some variations, the liquid formulation is delivered into and no further than the active vasculature of the plant when the injection tool is inserted into the trunk of the tree. In certain variation, the liquid formulation is delivered into and no further than the xylem, or the phloem or both of the plant when the injection tool is inserted into the post portion of the plant. In one variation, the liquid formulation is delivered into and no further than the xylem, or the phloem or both of the plant when the injection tool is inserted into the trunk or stem of the plant.

In some variations, the methods deliver at least 50%, at least 60%, at least 70%, at least 80%, at least 90%, at least 95%, at least 96%, at least 97%, at least 98% or at least 99% of the liquid formulation into to the active vasculature of the plant. In one variation, the methods deliver at least 50%, at least 60%, at least 70%, at least 80%, at least 90%, at least 95%, at least 96%, at least 97%, at least 98% or at least 99% of the liquid formulation into the xylem and/or phloem of the plant.

In certain embodiments, the method comprises injecting liquid formulation into the vasculature through one or more sites on post portion of the plant. In certain embodiments, the method comprises injecting liquid formulation into the vasculature through one or more sites on the trunk of the tree. In embodiments where the formulation is injected through multiple injection sites, a plurality of the injection systems described herein may be used. In some embodiments where the formulation is injected through multiple injection sites, the system comprises multiple injection tools operatively connected to a single fluid delivery unit.

The injection tools, injection systems and methods described herein generally provide one or more commercial advantages over the tools, systems and methods currently known in the art. In some embodiments, advantages may include one or more of a faster return to the production yields pre-infection, fast response (e.g., curing), lower volumes of formulation needed, less loss of formulation to the environment, less damage to the tree, response in old trees including trees older than 100 years, response in trees with significant disease symptoms (e.g., with 50% or less remaining canopy foliage and faster administration to the trees).

In embodiments, the injection systems comprise an injection tool, a fluid delivery unit, and a liquid formulation source. In operation, the injection tool is operatively connected to the fluid delivery unit such that liquid formulation flows from the source through the injection tool into the plant. In some embodiments, the source of liquid formulation is independent of the fluid delivery unit. In other embodiments, the source of liquid formulation is integral with the fluid delivery unit. Certain embodiment of injection systems suitable for use in the methods herein are described in further detail below.

Injection Tool

In some embodiments, the injection tool includes a penetrating distribution body, at least a portion of which is designed to be lodged into a plant, for example the trunk of a tree. The body has a channel system (e.g., one or more channels) through which the liquid formulation can flow. In some variations, the liquid formation enters the injection tool through one or more inlets, and exits the injection tool through one or more outlets through which the liquid formulation is delivered to the interior of the plant. In some embodiments, the lodged portion of the body is sized and shaped to reduce or minimize damage to the target plant when inserted into the plant, while maintaining efficient functionality of the injection tool in delivering the desired dosing of the liquid formulation over the desired time period directly to the sapwood and not the heartwood of the trunk of the plant. In other embodiments, the lodged portion of the body is sized and shaped to reduce damage to the target plant when inserted into the plant, as compared to traditional drilling injection system.

In some variations, exemplary injection tools are depicted in the figures herein. With reference to FIGS. 1A-1C, depicted are a front view, a profile view, and a cross-sectional view, respectively, of exemplary injection tool 100 having base 104 and body 102. The cross sectional view in FIG. 1C is taken along line A-A of FIG. 1B. Body 102 includes a cutting element. For example, in one variation, body 102 includes cutting edge 110, directed distally away from base 104. As depicted, body 102 further includes flat portion 106, with flat faces 106a and 106b; angled portion 108, with angled faces 108a and 108b; and tapered edges 112, with faces 112a and 112b. Cutting edge 110 is formed where angled faces 108a and 108b meet. Distribution reservoirs 128 are positioned within body 102. The plurality of distribution reservoirs 128 are spaced from cutting edge 110; these distribution reservoirs perforate flat faces 106a and 106b. The width of the portion of body 102 that is proximal to base 104 is greater than the width of base 104 in contact with the body.

With reference again to FIGS. 1A-1C, base 104 includes inlets 122, which receive liquid formulation from a fluid delivery unit. Base 104 includes anchor leg 114, which is positioned between the two inlets. Anchor leg 114 may be connected to tip adapters and/or tip setters to assist with precisely installing injection tool 100 into a plant. Base 104 includes inlets 122 to facilitate connection to a fluid delivery device. As depicted, inlets 122 have a ribbed outer structure to facilitate grasping of base 104 and to securely connect injection tool 100 with a fluid delivery unit. As depicted, base 104 also includes groove 118, which is configured to engage with a tip adapter and/or tip setter.

It should be understood that one or more elements of injection tool 100 described above may be optional. For example, in some variations, anchor leg 114 and/or groove 118 are optional in the design of the injection tool. In other variations, inlets 122 may have a smooth outer structure, instead of a ribbed outer structure.

With reference again to FIGS. 1A-1C, injection tool 100 further includes an internal channel system. The internal channel system includes primary distribution channels 126 and secondary distribution channels 130. Primary distribution channels 126 receive liquid formulation from the fluid delivery unit, and internally connect inlets 122 to the distribution reservoirs 128. Secondary distribution channels 130 connect adjacent distribution reservoirs 128, for example, within a single row.

It should be understood that, in other variations, the internal channel system may vary. In some variations, the primary distribution channels connect at least one inlet to every distribution reservoir, for example, as depicted in FIGS. 1C and 5C. In some variations, the primary distribution channels connect each inlet to at least one distribution reservoir, for example, as depicted in FIGS. 2C, 3C, and 4C. In some variations, the secondary distribution channels connect adjacent distribution reservoirs within a single row, for example, as depicted in FIGS. 1C, 2C, 3C, 4C, and 5C. In some variations, the secondary distribution channels connect adjacent distribution reservoirs in different rows, for example, as depicted in FIG. 4C.

With reference again to FIGS. 1A-1C, at least a portion of each distribution reservoir 128 has a round shape. Distribution reservoirs 128 are configured in two rows of four, arranged in a square lattice. As used herein, "square lattice" refers to an arrangement in which two adjacent distribution reservoirs in one row and the nearest two distribution reservoirs in an adjacent row form four corners of a square or rectangle (where the distribution reservoirs are positioned along a straight line within a row), or a trapezoid (where the distribution reservoirs are positioned along a curved line within a row), for example, as illustrated by the dotted lines in FIGS. 1A, 2A, and 3A.

While two inlets 122 and eight distribution reservoirs 128 are depicted in the exemplary injection tool 100 (FIGS. 1A-1C), it should be understood that, in other variations, the injection tool may have one or multiple inlets in the base operatively connected to the fluid delivery device. In other variations, the injection tool may have more or fewer distribution reservoirs in the body. For example, in some embodiments, the injection tool has eight (FIG. 1A), twenty-six (FIG. 2A), nineteen (FIG. 3C), or seven distribution reservoirs (FIGS. 4A and 5A).

In some variations, the size, shape and arrangement of the distribution reservoirs in the body of the injection tool may vary. For example, in some embodiments, the distribution reservoirs may have a circular shape as depicted in FIGS. 2A, 3A, 4A, and 5A. In other variations, a portion of a given distribution reservoir may be rounded, as depicted in FIG. 1A.

In some embodiments, the distribution reservoirs may be arranged in a square lattice as described above. In other embodiments, the distribution reservoirs may be arranged in a triangular lattice as depicted in FIGS. 4A-4C and 5A-5C. As used herein, "triangular lattice" refers to an arrangement in which a distribution reservoir in one row and the nearest two distribution reservoirs in an adjacent row form three corners of an acute triangle, for example, as illustrated by the dotted lines in FIGS. 4A and 5A.

With reference to FIGS. 2A-2C, depicted are a front view, a profile view, and a cross-sectional view, respectively, of an exemplary injection tool 200 having base 204 and body 202, having certain similar features as injection tool 100 depicted in FIGS. 1A-1C. The cross sectional view in FIG. 2C is taken along line A-A of FIG. 2B. Body 202 includes a cutting element. For example, in one variation, body 202 includes cutting edge 210, directed distally away from the base 204. As depicted, body 202 further includes flat portion 206, with flat faces 206a and 206b; angled portion 208, with angled faces 208a and 208b; and tapered edges 212, with faces 212a and 212b. Cutting edge 210 is formed where angled faces 208a and 208b meet. Distribution reservoirs 228 are positioned within body 202. The plurality of distribution reservoirs 228 are spaced from cutting edge 210; these distribution reservoirs perforate flat faces 106a and 106b. The width of the portion of body 202 that is proximal to base 204 is greater than the width of base 204 in contact with the body.

With reference again to FIGS. 2A-2C, base 204 includes inlets 222, which receive liquid formulation from a fluid delivery unit. Base 204 includes anchor leg 214, which is positioned between the two inlets. Anchor leg 214 may be connected to tip adapters and/or tip setters to assist with precisely installing injection tool 200 into a plant. Base 204 includes inlets 222 to facilitate connection to a fluid delivery device. As depicted, inlets 222 have a ribbed outer structure to facilitate grasping of base 204 and to securely connect injection tool 200 with a fluid delivery unit. As depicted, base 204 also includes groove 218, which is configured to engage with a tip adapter and/or tip setter.

With reference again to FIGS. 2A-2C, injection tool 200 further includes an internal channel system, which spans body 202 and base 204. The internal channel system includes primary distribution channels 226 and secondary distribution channels 230. Primary distribution channels 226 receive liquid formulation from the fluid delivery unit, and internally connect inlets 222 to at least one distribution reservoir 228. Secondary distribution channels 230 connect adjacent distribution reservoirs 228, for example, within a row.

With reference again to FIGS. 2A-2C, each distribution reservoir has a circular shape. Distribution reservoirs 228 are configured in three rows of seven and one row of five, arranged in a square lattice.

With reference to FIGS. 3A-3C, depicted are a front view, a profile view, and a cross-sectional view, respectively, of an exemplary injection tool 300 having base 304 and body 302, having certain similar features as injection tool 100 depicted in FIGS. 1A-1C. The cross sectional view in FIG. 3C is taken along line A-A of FIG. 3B. Body 302 includes a cutting element. For example, in one variation, body 302 includes cutting edge 310, directed distally away from the base 304. As depicted, body 302 further includes flat portion 306, with flat faces 306a and 306b; angled portion 308, with angled faces 308a and 308b; and tapered edges 312, with faces 312a and 312b. Cutting edge 310 is formed where angled faces 308a and 308b meet. Distribution reservoirs 328 are positioned within body 302. The plurality of distribution reservoirs 328 are spaced from cutting edge 310; these distribution reservoirs perforate flat faces 306a and 306b; a portion of distribution reservoirs 328 also perforate faces 312a and 312b. The width of the portion of body 302 that is proximal to base 304 is equal to the width of base 304 in contact with the body.

With reference again to FIGS. 3A-3C, base 304 includes inlets 322, which receive liquid formulation from a fluid delivery unit. Base 304 includes anchor leg 314, which is positioned between the two inlets. Anchor leg 314 may be connected to tip adapters and/or tip setters to assist with precisely installing injection tool 300 into a plant. Base 304 includes inlets 322 to facilitate connection to a fluid delivery device. As depicted, inlets 322 have a ribbed outer structure to facilitate grasping of base 304 and to securely connect injection tool 300 with a fluid delivery unit. As depicted, base 304 also includes groove 318, which is configured to engage with a tip adapter and/or tip setter.

With reference again to FIGS. 3A-3C, injection tool 300 further includes an internal channel system, which spans body 302 and base 304. The internal channel system includes primary distribution channels 326 and secondary distribution channels 330. Primary distribution channels 326 receive liquid formulation from the fluid delivery unit, and internally connect inlets 322 to at least one distribution reservoir 328. Secondary distribution channels 330 connect adjacent distribution reservoirs 328, for example, within a row.

With reference again to FIGS. 3A-3C, each distribution reservoir has a circular shape. Distribution reservoirs 328 are configured in two rows of seven and one row of five, arranged in a square lattice.

With reference to FIGS. 4A-4C, depicted are a front view, a profile view, and a cross-sectional view, respectively, of an exemplary injection tool 400 having base 404 and body 402, having certain similar features as injection tool 100 depicted in FIGS. 1A-1C. The cross sectional view in FIG. 4C is taken along line B-B of FIG. 4B. Body 402 includes a cutting element. For example, in one variation, body 402 includes cutting edge 410, directed distally away from the base 404. As depicted, body 402 further includes flat portion 406, with flat faces 406a and 406b; angled portion 408, with angled faces 408a and 408b; and tapered edges 412, with faces 412a and 412b. Cutting edge 410 is formed where angled faces 408a and 408b meet. Distribution reservoirs 428 are positioned within body 402. The plurality of distribution reservoirs 428 are spaced from cutting edge 410; these distribution reservoirs perforate flat faces 406a and 406b; a portion of distribution reservoirs 428 also perforate faces 412a and 412b. The width of the portion of body 402 that is proximal to base 404 is greater than the width of base 404 in contact with the body.

With reference again to FIGS. 4A-4C, base 404 includes inlets 422, which receive liquid formulation from a fluid delivery unit. Base 404 includes anchor leg 414, which is positioned between the two inlets. Anchor leg 414 may be connected to tip adapters and/or tip setters to assist with precisely installing injection tool 400 into a plant. Base 404 includes inlets 422 to facilitate connection to a fluid delivery device. As depicted, inlets 422 have a ribbed outer structure to facilitate grasping of base 404 and to securely connect injection tool 400 with a fluid delivery unit. As depicted, base 404 also includes groove 418, which is configured to engage with a tip adapter and/or tip setter.

With reference again to FIGS. 4A-4C, injection tool 400 further includes an internal channel system, which spans body 402 and base 404. The internal channel system includes primary distribution channels 426, secondary distribution channels 430, and intervening distribution channels 432. Primary distribution channels 426 receive liquid formulation from the fluid delivery unit, and internally connect inlets 422 to at least one distribution reservoir 428. Secondary distribution channels 430 connect adjacent distribution reservoirs 428 within a row. Secondary distribution channels 430 also connect adjacent distribution reservoirs 428 in different rows.

With reference again to FIGS. 4A-4C, each distribution reservoir has a circular shape. Distribution reservoirs 428 are configured in one row of four and one row of three, arranged in a triangular lattice.

With reference to FIGS. 5A-5C, depicted are a front view, a profile view, and a cross-sectional view, respectively, of an exemplary injection tool 500 having base 504 and body 502, having certain similar features as injection tool 100 depicted in FIGS. 1A-1C. The cross sectional view in FIG. 5C is taken along line A-A of FIG. 5B. Body 502 includes a cutting element. For example, in one variation, body 502 includes cutting edge 510, directed distally away from the base 504. As depicted, body 502 further includes flat portion 506, with flat faces 506a and 506b; angled portion 508, with angled faces 508a and 508b; and tapered edges 512, with faces 512a and 512b. Cutting edge 510 is formed where angled faces 508a and 508b meet. Distribution reservoirs 528 are positioned within body 502. The plurality of distribution reservoirs 528 are spaced from cutting edge 510; these distribution reservoirs perforate flat faces 506a and 506b; a portion of distribution reservoirs 528 also perforate faces 512a and 512b. The width of the portion of body 502 that is proximal to base 504 is equal to the width of base 504 in contact with the body.

With reference again to FIGS. 5A-5C, base 504 includes inlets 522, which receive liquid formulation from a fluid delivery unit. Base 504 includes anchor leg 514, which is positioned between the two inlets. Anchor leg 514 may be connected to tip adapters and/or tip setters to assist with precisely installing injection tool 500 into a plant. Base 504 includes inlets 522 to facilitate connection to a fluid delivery device. As depicted, inlets 522 have a ribbed outer structure to facilitate grasping of base 504 and to securely connect injection tool 500 with a fluid delivery unit. As depicted, base 504 also includes groove 518, which is configured to engage with a tip adapter and/or tip setter.

With reference again to FIGS. 5A-5C, injection tool 500 further includes an internal channel system, which spans body 502 and base 504. The internal channel system includes primary distribution channels 526 and secondary distribution channels 530. Primary distribution channels 426 receive liquid formulation from the fluid delivery unit, and internally connect inlets 522 to distribution reservoirs 528. Secondary distribution channels 530 connect adjacent distribution reservoirs 528 within a row.

With reference again to FIGS. 5A-5C, each distribution reservoir has a circular shape. Distribution reservoirs 528 are configured in one row of four and one row of three, arranged in a triangular lattice.

With reference to FIGS. 1A-1C, 2A-2C, 3A-3C, 4A-4C, and 5A-5C, the injection tool is inserted along an insertion direction Y. The body of the injection tool helps to spread the plant material aside as the injection tool is inserted into the plant. Spreading of the plant material minimizes trauma to the plant material, and in some examples can facilitate enhanced uptake of formulations.

In some variations, the body of the injection tool is connected to the base and is configured to position the injection tool so that the body is inserted into the vasculature of the plant, and not too deep in the plant. The base is configured to position the injection tool so that the body is inserted into, and not further than, the active vasculature of the plant.

In some variations, the internal channel system is configured to reduce, minimize or eliminate the amount of wood that enters the primary and secondary distribution channels when the injection tool is injected into the plant. This helps to ensure that the liquid formulation can flow into the distribution reservoirs. The distribution reservoirs then retain the liquid formulation in residence proximate to adjacent plant tissues after the injection tool is inserted into the plant.

In some embodiments, the injection systems described herein comprising the exemplary injection tools depicted in the figures do not require drilling a hole or installing a valve in the trunk of the tree before injecting the liquid formulation.

Fluid Delivery Unit

In some embodiments, the fluid delivery unit and the source of the liquid formulation are integrated into a formulation cartridge, such as a pressurized container. In certain variations, the formulation cartridge is a pressurized canister. In operation, the liquid formulation flows from the fluid delivery unit through the injection tool into the plant. See e.g., WO 2020/021041.

In some embodiments, the injection systems or components thereof used in the methods described herein are as depicted in the figures. In some embodiments, the systems are configured to administer liquid formulation comprising one or more active ingredients (including, for example, nutrients) to a plant or a part thereof. In certain embodiments, such systems are mounted onto a post portion of a plant, for example to a trunk of the tree.

In some embodiments, the methods provided herein include installing an injection tool in the trunk, stem, root or limb of a plant, operatively connecting the injection tool to a fluid delivery unit, and activating the fluid delivery unit to initiate the flow of fluid from the fluid delivery unit through the injection tool and into the plant In other embodiments, two or more injection tools are installed into one or more of the stem, trunk, roots, limbs or the like of a plant to minimize trauma to the plant (e.g., by minimizing the size of a unitary hole in the plant or spacing the tools apart along the plant).

In some such embodiments, the two or more injection tools are operatively connected to the same fluid delivery unit. In other such embodiments the two or more injection tools are operatively connected to independent fluid delivery unit.

In some variations, the fluid delivery unit comprises a spring-loaded fluid delivery unit. In certain variations of the foregoing, the spring-loaded fluid delivery unit is configured to operate at a pressure between 1.5-3 bar. In other variations, the fluid delivery unit comprises a fluid delivery unit comprising a pressurized container (e.g., a pressurized canister).

In other exemplary embodiments, the spring-loaded fluid delivery unit may have a base holding one or multiple springs within one or multiple corresponding syringes. The design of the spring-loaded fluid delivery unity may vary based on the pressure, volume, time or other appropriate parameters to deliver the liquid formulation. For example, in some variations, multiple springs (such as a dual spring) may be employed in the fluid delivery unit to allow for injection of a higher volume of the liquid formulation. In other variations, a single spring with a larger syringe may be used, but may affect pressure range employed to inject the liquid formulation.

In some variations, the delivery unit is designed as a pneumatically or hydraulically operated dosing pump configured to administer a fluid formulation (e.g., a fluid including one or more of a liquid, gas, gel, vapor, aerosol or the like). Alternatively, the delivery unit is designed as a pneumatic or hydraulic delivery pump configured to provide one or more pressures. In some examples, the pressures provided are proximate to but greater than ambient pressure to provide gradual low pressure delivery of the formulation to a plant. In another example, the delivery unit provides the liquid formulation in a passive manner, for instance by way of hydrostatic pressure or capillary action. The delivery device is, in one example, designed as a two-chamber assembly, wherein two chambers are arranged in a container, of which one chamber contains a pressure medium and the other contains an active ingredient formulation which can be expelled from the two-chamber assembly through a valve by the pressure medium. See e.g., WO 2020/212612.

Uses of the Injection Tools and Injection Systems

In some embodiments, this disclosure provides methods for enhancing or maintaining plant health using the injection tools and injection systems herein. In some such embodiments, this disclosure provides methods for treating diseased plants and/or methods for controlling bacteria, fungi, viruses and/or other pathogens which cause disease in plants. In further such embodiments, this disclosure provides methods for treating plants whose xylem has been invaded by disease-causing bacteria, fungi, viruses, and/or other pathogens, for controlling the bacteria, fungi, virus and/or other pathogens causing the disease, and for preventing diseases by preventing sufficient colonization of the plant by the disease causing pathogens such as bacteria, fungi, and viruses.

The injection system according to the disclosure is suitable for being applied to various different plants. Thereby, the shape and dimensions of the injection tools involved advantageously are adapted to the intended application. More specifically, the injection tool can be designed for being applied to comparably large plants and specifically to trees, bushes or other woody plants. Or, it can be designed for being applied to comparably small or smaller plants. For example, injection tools suitable for woody plants may have a total length of more than 50 millimeter (mm) or in a range of between 60 mm and 200 mm. The respective penetrating distribution bodies (e.g., shaft or wedge body profiles) include lengths of 35 mm or more and in some examples are in a range of between approximately 35 mm and 160 mm, and/or a width of 30 mm or more or are in a range of between approximately 35 mm and 150 mm. In contrast, injection tools intended for comparably small plants optionally have a total length of between approximately 3 mm and 20 mm, between approximately 6 mm and 16 mm, or less than 10 mm.

In a further other aspect, the disclosure is a process of modulating the phenotype of a plant or a multitude of plants, said process including the steps of (i) installing a plant injection system according to the disclosure provided herein in the plant or multitude of plants, and (ii) applying a liquid formulation of an active ingredient to modulate the phenotype of the plant.

The active ingredient is selected from the group consisting of (i) pesticides, (ii) growth regulators. The active ingredient is a biological compound or composition approved for food and feed application.

Liquid Formulations

Any suitable liquid formulations may be used. In certain embodiments, the liquid formulation is water soluble. In some variations, the liquid formulation comprises nutrients. In certain variations, the liquid formulation comprises micronutrients.

Formulations are prepared e.g. by mixing the active ingredients with one or more suitable additives such as suitable extenders, solvents, spontaneity promoters, carriers, emulsifiers, dispersants, frost protectants, biocides, thickeners, adjuvants or the like. An adjuvant in this context is a component which enhances the biological effect of the formulation, without the component itself having a biological effect. Examples of adjuvants are agents which promote the retention, spreading, or penetration in the target plant. One embodiment of the disclosure comprises a long-term supply of the active ingredient to the plant over the growing season, with an auxiliary being stabilizers, such as low-temperature stabilizers, preservatives, antioxidants, light stabilizers or other agents which improve chemical and/or physical stability.

Examples of typical formulations include water-soluble liquids (SL), emulsifiable concentrates (EC), emulsions in water (EW), suspension concentrates (SC, SE, FS, OD), water-dispersible granules (WG) and fluids (which include one or more of a liquid, gas, gel, vapor, aerosol or the like). These and other possible types of formulation are described, for example, by Crop Life International and in Pesticide Specifications, Manual on development and use of FAO and WHO specifications for pesticides, FAO Plant Production and Protection Papers, prepared by the FAO/WHO Joint Meeting on Pesticide Specifications, 2004, ISBN: 9251048576; "Catalogue of pesticide formulation types and international coding system", Technical Monograph No. 2, 6th Ed. May 2008, CropLife International.

Examples for suitable auxiliaries are solvents, liquid carriers, surfactants, dispersants, emulsifiers, wetters, adjuvants, solubilizers, penetration enhancers, protective colloids, humectants, repellents, attractants, feeding stimulants, compatibilizers, bactericides, anti-freezing agents, anti-foaming agents, colorants, stabilizers or nutrients, UV protectants, tackifiers and/or binders. Specific examples for each of these auxiliaries are well known to the person of ordinary skill in the art, see e.g., US 2015/0296801.

What is claimed is:

1. A plant injection tool comprising:
    a base comprising:
        multiple inlets to receive liquid formulation; and
        an anchor leg disposed between a first one of the multiple inlets and a second one of the multiple inlets; and
    a penetrating distribution body connected to the base, the penetrating distribution body comprising:
        a cutting element;
        a plurality of distribution reservoirs arranged in one or more rows that are positioned between the cutting element and the base, wherein at least a portion of each distribution reservoir has a round shape;
        multiple primary distribution channels, a first one of the primary distribution channels coupled in fluid communication with the first one of the multiple inlets and at least one of the plurality of distribution reservoirs, and a second one of the primary distribution channels coupled in fluid communication with the second one of the multiple inlets and at least one other one of the plurality of distribution reservoirs; and
        secondary distribution channels connecting adjacent distribution reservoirs.

2. The plant injection tool of claim 1, wherein the plurality of distribution reservoirs is arranged in a plurality of rows.

3. The plant injection tool of claim 2, wherein ones of the plurality of distribution reservoirs are arranged in a square lattice.

4. The plant injection tool of claim 2, wherein ones of the plurality of distribution reservoirs are arranged in a triangular lattice.

5. The plant injection tool of claim 1, wherein the plurality of distribution reservoirs are arranged to maximize lateral spread of the formulation.

6. The plant injection tool of claim 1, wherein the plurality of distribution reservoirs is arranged to minimize clogging of the plurality of distribution reservoirs and/or the secondary distribution channels upon insertion into the plant.

7. The plant injection tool of claim 1, wherein the distribution reservoirs have a circular shape.

8. The plant injection tool of claim 1, wherein, upon insertion into the plant, at least one distribution reservoir is configured to retain a liquid formulation proximate to adjacent tissue of the plant.

9. A plant injection system, comprising:
    the plant injection tool of claim 1 operatively connected to a fluid delivery unit, wherein the fluid delivery unit is configured to deliver a liquid formulation, through the plurality of distribution reservoirs.

10. The plant injection system of claim 9, wherein the delivery unit is a spring-loaded fluid delivery unit.

11. The plant injection system of claim 9, wherein the delivery unit comprises a pressurized formulation cartridge.

\* \* \* \* \*